March 12, 1940.  M. D. COULTER  2,193,622
PRESERVING BAKERY PRODUCTS
Filed July 3, 1935
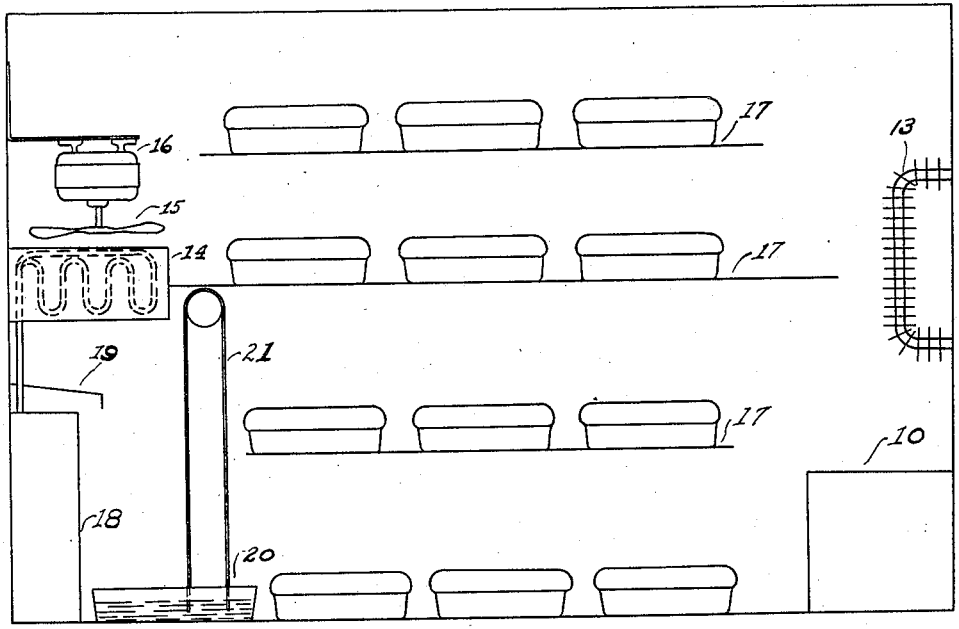
Fig. I
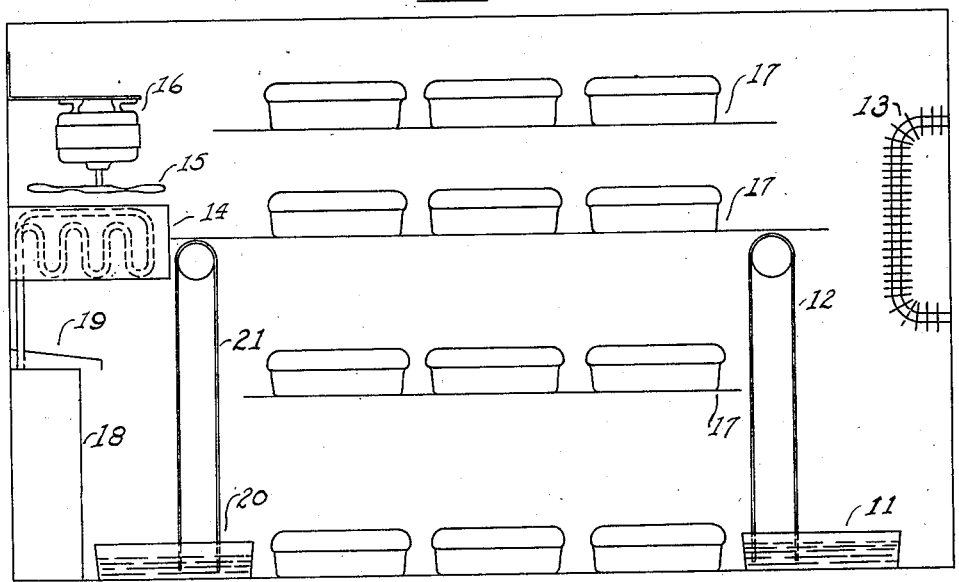
Fig. II
Marion D. Coulter
INVENTOR
BY
ATTORNEYS Patented Mar. 12, 1940

2,193,622

UNITED STATES PATENT OFFICE 2,193,622

PRESERVING BAKERY PRODUCTS

Marion D. Coulter, Pittsburgh, Pa., assignor to Toledo Scale Manufacturing Company, a corporation of New Jersey Application July 3, 1935, Serial No. 29,665

3 Claims. (Cl. 99—90)

Although research workers have studied the problem of spoilage of bakery products for many years, they have not been able to reduce in any appreciable degree the quantity of bakery products wasted in the United States, amounting to millions of pounds every week. In the production of these products, it has been found impossible to prevent deposition of mold spores, which are universally present in the atmosphere, on the baked goods before they are wrapped.

The common mold spores require from three to seven days for incubation on bread enclosed in a wrapper or box. If, instead of spores, a particle of living mold is deposited on the loaf, active growth starts immediately. Mold does not develop on bread that is unwrapped and left to dry out in the open air, but the drying out of bread in the open air renders it unfit for food at the end of one or two days.

Changes in the condition of bread caused by molding or drying out, unlike the chemical change known as "staling", are not reversible, so that after they have occurred it is impossible to restore the bread to edible condition. No means has been known for treating bread to prevent mold growth, without allowing it to dry out rapidly, or tainting it so much as to render it unsalable.

In accordance with the present invention, molding of bakery products, particularly when uncut, is prevented by the use, in conjunction with the maintenance of certain critical atmospheric conditions in the space where the products are stored, of agencies that have heretofore failed to inhibit such molding. It has been discovered that maintaining these critical atmospheric conditions produces an increased effectiveness of anti-mold agencies that are not capable of tainting bread, and that their increased effectiveness is such that they prevent molding. Under normal atmospheric conditions, these agencies are not effective to arrest mold growth.

In order to make effective the anti-mold agency that is employed, atmospheric conditions of temperature or relative humidity or both may be maintained within predetermined limits. Either temperature may be regulated while relative humidity is allowed to rise, or relative humidity may be regulated while temperature is allowed to vary with changes in weather. On the other hand, temperature and relative humidity may both be regulated, when neither needs to be kept as low as if temperature or relative humidity alone were controlled.

The principal object of the invention is the preservation of bakery products by use of novel systems for preventing mold growth. More specific objects and advantages are apparent from the description, in which reference is had to the accompanying drawing illustrating two types of apparatus embodying the invention.

Figure I of the drawing is a diagrammatic vertical section of a bread storage cabinet containing preserving apparatus that includes a unit for generating mold-inhibiting radio or sound waves.

Figure II is a diagrammatic vertical section of a bread storage cabinet containing preserving apparatus that includes a device for bringing a liquid comprising a volatile anti-mold agent into contact with the atmosphere of the cabinet.

The specific drawing and the specific description that follows are to disclose and illustrate the invention and are not to impose limitations upon the claims.

One of the agencies contemplated by the present invention for preventing mold growth on bakery products is an apparatus 10 shown in Fig. I for generation of short radio waves or ultrasonic vibrations. Instead of the wave-generating apparatus, plate electrodes may be provided to which a high electrical potential is applied. When the bakery products to be preserved are stored between the electrodes, the desired effect is produced.

The preferred mold-inhibiting agencies, however, are substances that may be introduced into the atmosphere of the bakery product storage cabinet, which do not taint the products when present in contact with them in effective concentrations. Substances that do not taint the products in effective concentrations are hereinafter called palatable anti-mold agents.

Volatile palatable anti-mold agents are the most easily dispersed into the atmosphere of the storage space, particularly when they can be dissolved in a suitable solvent. One such agent is hydrogen peroxide, which can be obtained commercially as a 30% aqueous solution.

It has been discovered that ammonia when introduced into the atmosphere of the cabinet in a concentration not quite sufficient to taint bakery products is a particularly effective anti-mold agent. When an aqueous solution is used as the source of ammonia, the proportion of ammonia by weight is preferably about .005 or .01%. Concentrations less than .005% have not been found sufficiently effective under ordinary circumstances, while a concentration of .015% may impart an odor of ammonia to the products.

None of the agencies above mentioned has been found entirely satisfactory when used alone for the preservation of bakery products. It has been discovered, however, that when they are used in conjunction with the maintenance of predetermined critical atmospheric conditions in the storage space, bakery products particularly when uncut are satisfactorily preserved. The vital atmospheric conditions have been found to be temperature and relative humidity. Since the critical temperatures that correspond to various anti-mold agencies are relatively high, a mere tempering rather than refrigeration of the atmosphere in the storage space is required. Mold growth flourishes with equal abundance both above and below the critical temperatures corresponding to various anti-mold agencies, when such agencies are not used.

When an aqueous solution of ammonia having an ammonia concentration of .01% is left in contact with the atmosphere of the storage cabinet, and when the relative humidity of that atmosphere is close to 100%, the temperature in the cabinet need only be as low as 75° F., but a temperature of 80° F. has not proved satisfactory. The newly discovered properties of gaseous ammonia when used in the atmosphere of the storage space within a narrow range of concentrations are such that ammonia may be used alone for preservation when a temperature of 75° F. or less prevails. In other cases, it is necessary to provide means for maintaining proper atmospheric conditions.

Successful preservation may also be achieved by use of anti-mold agencies in conjunction with the maintenance of a per cent relative humidity that is below a predetermined critical value. In the majority of cases, a relative humidity of 81% is very satisfactory. Except when this value for relative humidity is used in conjunction with an anti-mold agency, it is of little avail, for a substantial growth of mold can be obtained both above and below 81% relative humidity in the absence of anti-mold agencies.

There are tabulated below a number of percentages of relative humidity at which substantial mold growth has appeared on the varieties of bread stated in the table. These instances of mold growth occurred during a long series of experiments, and each of the experiments in which the growth occurred at the relative humidity stated below was one in which no anti-mold agency was used.

| Type of bread | Percent relative humidity |
| --- | --- |
| Cracked wheat, rye | 76.0 |
| Rye, cracked wheat | 77.5 |
| Raisin, Vienna, soft rolls, hard rolls | 77.5 |
| Cracked wheat, rye, home made, soft bun | 78.0 |
| Raisin, Vienna, soft rolls, hard rolls | 80.0 |
| Doughnuts, cinnamon rolls, sweet rolls, cocoanut rolls | 80.0 |
| Soft bun, rye, cracked wheat, home made | 80.0 |
| Raisin, Vienna, soft rolls, hard rolls | 82.5 |
| Soft bun, rye, cracked wheat, home made | 82.5 |
| Doughnuts, cinnamon rolls, sweet rolls, cocoanut rolls | 82.5 |

At 81% relative humidity, the rate at which the common varieties of bread lose water is not great enough to cause the bread to become seriously dried out for about a week. There is tabulated below the weight loss in percentage of the initial weight of samples of four types of bread, during exposure for various periods of time to 81% relative humidity.

| Period of exposure in hours | Loss in percentage of initial weight | | | |
| --- | --- | --- | --- | --- |
| | Cracked wheat | Rye | Home made | Soft bun |
| 20 | 0.2 | 0.8 | 1.4 | 2.0 |
| 43 | 1.3 | 2.0 | 2.6 | 4.0 |
| 67 | 2.1 | 3.1 | 4.1 | 6.1 |
| 92 | 3.2 | 5.1 | 8.4 | 9.0 |
| 116 | 4.6 | 7.9 | 11.6 | 11.6 |
| 163 | 8.2 | 12.0 | 17.0 | 15.0 |

It has been found that hard rolls and Vienna bread can be preserved at a relative humidity as low as 75%, although 81% relative humidity is not high enough to cause softening of their crust. Soft rolls cannot be preserved as long as other products because they dry out more rapidly. Cinnamon rolls, ordinary sweet rolls, cocoanut rolls and cake-batter doughnuts require a relative humidity below 80% in order to prevent their crusts from becoming sticky.

Although 81% relative humidity has been recommended for all ordinary temperatures, and 75° for all relative humidities of an atmosphere containing ammonia, it is possible to regulate both the relative humidity and the temperature of the atmosphere in order to make effective the anti-mold agency that is used. Thus, if the relative humidity is continuously maintained a certain amount below 100%, the critical value below which the temperature must be maintained may be higher than 80° F.; for the critical temperature depends upon the relative humidity as well as upon the nature of the anti-mold agency employed. Again, if a certain reduced temperature is continuously maintained, the critical value of relative humidity below which a given anti-mold agency becomes effective may be higher than 81%.

The two preferred palatable anti-mold agents that have been mentioned are soluble in water and are volatile, so that they may be conveniently introduced into the atmosphere of the storage space by use of an aqueous solution. In order to bring a liquid comprising a volatile anti-mold agent into contact with the air, a current of air may be passed through a spray of the liquid or a packed tower, or other gas and liquid contact device.

The liquid comprising a volatile anti-mold agent may be an aqueous solution having a substantially constant vapor pressure, preferably in the range seventy-five to eighty-five per cent of the vapor pressure of water. Even when a solution of a volatile anti-mold agent with no other solute is used, a separate aqueous solution having the proper vapor pressure can be employed to maintain the desired relative humidity in the storage space. For this purpose, a sulphuric acid solution of about 25% concentration suffices, if brought into intimate contact with the atmosphere. However, a substantially saturated aqueous solution having a vapor pressure in the range seventy-five to eighty-five per cent of the vapor pressure of water is preferred, and an undissolved excess of solute in contact with the solution prevents it from becoming unsaturated. The relative humidity of air in equilibrium with such a saturated solution is caused to vary only about one per cent by annual variations in temperature occurring in ordinary temperate climates.

Saturated solutions of the following salts have been found satisfactory for maintaining in storage cabinets the relative humidities stated below:

| Salt used in saturated solution | Per cent relative humidity at 20° C. |
|---|---|
| Sodium acetate $NaC_2H_3O_2.3H_2O$ | 76.0 |
| Sodium thiosulphate $Na_2S_2O_3.5H_2O$ | 78.0 |
| Ammonium chloride $NH_4Cl$ | 79.2 |
| Ammonium sulphate $(NH_4)_2SO_4$ | 81.0 |

Substantially stable ammonium salts of strong mineral acids are preferred because the vapor pressure of their saturated aqueous solutions is best suited to most bakery products. In addition, they appear to act to some extent as mold-inhibiting agents. It is believed that the slight volatilization and dissociation of these salts provides ammonia in effective concentrations. Ammonium sulphate is cheaper than ammonium chloride, has a slightly more desirable vapor pressure, and has been found to have a greater inhibiting effect upon the growth of bread mold.

Successful protection of bakery products against mold growth has been attained by use of a solution prepared from ammonium sulphate and hydrogen peroxide. After aqueous solutions of the two compounds have been mixed gradually in a cooled vessel, the resulting solution is relatively stable. It is believed to contain two definite compounds, in one of which a molecule of ammonium sulphate is combined with a molecule of hydrogen peroxide, and in the other of which two molecules of ammonium sulphate are combined with a molecule of hydrogen peroxide.

During an experiment that lasted for 129 hours, the solution prevented mold growth on the exterior of loaves of rye, cracked wheat, home made and soft bun bread stored in an atmosphere exposed thereto. The stability of the preserving solution thus appears to be such that hydrogen peroxide continues to be set free for ten days or more instead of disappearing rapidly as it does in a solution of hydrogen peroxide alone.

The proportions of ammonium sulphate and hydrogen peroxide used in the preserving solution should be such that there is always an undissolved excess of ammonium sulphate. If 139 parts of 30% hydrogen peroxide solution are mixed with a solution of ammonium sulphate containing 103 parts of water, there should be present at least 162 parts of ammonium sulphate. The combining of ammonium sulphate and hydrogen peroxide appears to go on very slowly so that the excess of undissolved ammonium sulphate disappears gradually. When only 162 parts of ammonium sulphate are used with the proportions of other ingredients stated above, the undissolved ammonium sulphate all passes into solution in the course of about 67 hours, and more of the salt must then be added in order to prevent the vapor pressure of the solution from falling below 80% of the vapor pressure of water.

Preserving solutions may also be made up from ammonium sulphate and ammonia, or ammonium sulphate, hydrogen peroxide and ammonia. When ammonium sulphate and ammonia are used, the proportion of ammonium sulphate should be sufficient to saturate the solution, and the ratio of the weight of ammonia to the weight of water should be about .0001 or slightly less.

It has been found that mold growth on stored bakery products is prevented by solutions in the storage space saturated with ammonium sulphate and containing ammonia and hydrogen peroxide with concentrations of ammonia and hydrogen peroxide varying over a wide range, the ratio of the weight of ammonia to the weight of water being below .00015 in all cases in order that tainting of the products may be avoided.

Figures I and II show two forms of apparatus that are alike except that Figure II illustrates a different mold-inhibiting agency from the inhibiting device 10 shown in Figure I. In Figure II this agency is shown in the form of a tray 11 for a liquid comprising a palatable volatile anti-mold agent. The liquid may be drawn upward by capillary attraction into wicking 12 that is supported by means of a suitable hanger in the path of an air current passing through the storage cabinet. Also arranged in the current of air may be a tempering coil 13 for maintaining a reduced temperature in the cabinet. The same current of air may also pass through a dehumidifier shown in the form of an evaporator 14. To circulate the air, a fan 15 may be driven by a motor 16 suitably supported above the evaporator 14.

The tempering coil 13 may be fed from a supply of refrigerant that is cut off by a suitable thermostatic device whenever the temperature in the cabinet falls low enough. If the evaporator 14 is being operated frequently to dehumidify the air, and if the cabinet is properly insulated, the evaporator may produce enough cooling so that the tempering coil can remain cut off.

The bakery products may be supported upon shelves 17 arranged in such a manner that the current of air is driven in one direction over the bakery products in the lower part of the cabinet and then back to the fan over the bakery products in the upper part of the cabinet. In the form of apparatus shown in the drawing, the refrigerating unit 18 that supplies the liquefied refrigerant to the evaporator 14 is located under the evaporator and is covered by a drain board 19 that conducts the defrosted water from the evaporator into a tray 20 in the bottom of the cabinet whenever the refrigerating unit ceases operation.

The refrigerating unit may be put into operation whenever the relative humidity in the cabinet gets too high, and stopped whenever the relative humidity in the cabinet gets too low, by means of any suitable type of automatic humidity control, not shown in the drawing. In addition, the tray 20 may be kept filled with water containing in solution a suitable substance such as ammonium sulphate, with an undissolved excess of the solute. In order to bring the salt solution into contact with the air, wicking 21 may be hung in the current of air in such a manner that it dips into the solution. The solution is provided for the purpose of preventing the relative humidity in the cabinet from falling too low.

Although both a tempering means and a humidity regulating means may be used in order to maintain predetermined critical atmospheric conditions that render effective the anti-mold agency employed, either of the two means may be omitted. Furthermore, the evaporator 14, refrigerating unit 18, and drain board 19 may be omitted whenever a humidity regulating solution is provided in the cabinet and brought into proper contact with the current of air, because the solution is capable of extracting moisture from the air as well as adding moisture to the air. But if the solution is used alone, excess solution that has accumulated through extraction of moisture from the air must be drawn off at intervals, and solute must be added occasionally. When a reservoir of such solution is provided, and when an anti-mold agent is employed that is capable of volatilization from the solution, the tray 11 and wicking 12 may be omitted, and the anti-mold agent may be incorporated with the solution used for regulating relative humidity.

After a loaf of bread is removed from its wrapper by a consumer, the mold spores incubating on the loaf at once become greatly augmented by deposition of spores from the unfiltered air of the home. In an experiment in which a loaf of bread was unwrapped and then replaced inside the wrapper with the opened end of the wrapper folded shut in the usual manner, luxuriant mold growth began to appear at the end of five days. A high relative humidity was maintained inside the wrapper by evaporation of moisture from the bread in this case as in the case of all wrapped bread. Yet the surrounding air was very dry and at a temperature below 75° F. It is thus apparent that bakery products can be preserved far better than by prior practices when treated according to the present invention.

The substance of the invention may be utilized in various ways to meet various requirements.

I claim as my invention:

1. A method of preserving bakery products that comprises bringing a substantially saturated aqueous solution of ammonium sulphate into contact with the atmosphere in which the products are stored to regulate the partial pressure of water vapor in the atmosphere and to inhibit mold growth on the products.

2. A method of preserving bakery products that comprises bringing an aqueous solution of a substantially stable ammonium salt of a strong mineral acid into contact with the atmosphere in which the products are stored to regulate the partial pressure of water vapor in the atmosphere and to inhibit mold growth on the products.

3. A method of preserving a bakery product in storage that comprises confining the atmosphere that surrounds the product, and bringing into contact with said atmosphere a substantially saturated aqueous solution of a substantially stable ammonium salt of a strong mineral acid, containing hydrogen peroxide.

MARION D. COULTER.